United States Patent
Martin

(10) Patent No.: US 7,285,223 B2
(45) Date of Patent: Oct. 23, 2007

(54) ENHANCED AIR AND WATER PURIFICATION USING CONTINUOUS BREAKPOINT HALOGENATION WITH FREE OXYGEN RADICALS

(75) Inventor: Roy Martin, Downers Grove, IL (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 348 days.

(21) Appl. No.: 10/972,122

(22) Filed: Oct. 22, 2004

(65) Prior Publication Data
US 2005/0109709 A1    May 26, 2005

Related U.S. Application Data

(62) Division of application No. 10/083,315, filed on Feb. 26, 2002, now Pat. No. 7,108,781.

(51) Int. Cl.
*C02F 1/32* (2006.01)
*C02F 1/72* (2006.01)

(52) U.S. Cl. .................. 210/739; 210/748; 210/753; 210/759; 210/143

(58) Field of Classification Search ............ 210/748, 210/758, 759, 753–756, 739, 143, 192, 198.1; 422/24, 186.3
See application file for complete search history.

(56) References Cited

U.S. PATENT DOCUMENTS

| 2,008,684 | A | 7/1935 | Craddock |
|---|---|---|---|
| 2,212,260 | A | 8/1940 | Brothman |
| 2,249,263 | A | 7/1941 | Wheelwright, Jr. |
| 2,268,461 | A | 12/1941 | Nichols |
| 2,556,014 | A | 6/1951 | Tolman |
| 2,651,582 | A | 9/1953 | Courtney |
| 2,686,110 | A | 8/1954 | Carver |
| 2,740,696 | A | 4/1956 | Longwell |
| 3,252,689 | A | 5/1966 | Blomgren, Sr. et al. |

(Continued)

FOREIGN PATENT DOCUMENTS

CA    1079423    6/1980

(Continued)

OTHER PUBLICATIONS

Lisa H. Nowell et al., "Photolysis of Aqueous Chlorine at Sunlight and Ultraviolet Wavelengths-II. Hydroxyl Radical Production," *Water Research*, vol. 26, No. 5, May 26, 1992, pp. 599-605, Marsh Barton, Exeter, Great Britain.

(Continued)

*Primary Examiner*—Frank M. Lawrence

(57) ABSTRACT

Continuous breakpoint halogenation with hydroxyl free radical species is used to increase the rate of sanitization a water system and maintain a high rate of oxidation in the bulk water of the pool, spas, and other water systems despite the presence of accumulated demand. Undesirable compounds can be eliminated by maintaining a level of desired oxidation potential. The feedrate and ratio of halogen donor and free radical species can be optimized to sustain the desired ppm range of halogen and sustain an ORP of, for example, 780 mV-820 mV. Sustaining these parameters can prevent or even reverse the accumulation of combined halogen and other halogenated volatile compounds, which can contaminate the air and water of water facilities such as indoor swimming pools.

19 Claims, 6 Drawing Sheets

U.S. PATENT DOCUMENTS

| | | |
|---|---|---|
| 3,319,937 A | 5/1967 | Wilson et al. |
| 3,389,970 A | 6/1968 | Scheibel |
| 3,536,646 A | 10/1970 | Hatch et al. |
| 3,559,959 A | 2/1971 | Davis et al. |
| T896,051 I4 | 3/1972 | Hamlin et al. |
| 3,702,298 A | 11/1972 | Zsoldos et al. |
| 3,742,735 A | 7/1973 | Verreyne et al. |
| 3,747,899 A | 7/1973 | Latinen, et al. |
| 3,756,570 A | 9/1973 | Bühner |
| 3,794,817 A | 2/1974 | Shinskey |
| 3,852,234 A | 12/1974 | Venema |
| 3,870,631 A | 3/1975 | Fassell et al. |
| 3,965,027 A | 6/1976 | Boffardi et al. |
| 4,016,078 A | 4/1977 | Clark |
| 4,087,360 A | 5/1978 | Faust et al. |
| 4,113,688 A | 9/1978 | Pearson |
| 4,125,574 A | 11/1978 | Kastner et al. |
| 4,146,676 A | 3/1979 | Saeman et al. |
| 4,171,166 A | 10/1979 | Trowbridge et al. |
| 4,217,145 A | 8/1980 | Gaddis |
| 4,218,147 A | 8/1980 | Rosenberger |
| 4,233,265 A | 11/1980 | Gasper |
| 4,234,440 A | 11/1980 | Hirozawa et al. |
| 4,241,016 A | 12/1980 | Hirozawa et al. |
| 4,243,636 A | 1/1981 | Shiraki et al. |
| 4,300,909 A | 11/1981 | Krumhansl |
| 4,402,836 A | 9/1983 | Fochtman et al. |
| 4,433,701 A | 2/1984 | Cox et al. |
| 4,456,512 A | 6/1984 | Bieler et al. |
| 4,470,907 A | 9/1984 | Seneza |
| 4,522,502 A | 6/1985 | Brazelton |
| 4,550,011 A | 10/1985 | McCollum |
| 4,575,678 A | 3/1986 | Hladky |
| 4,581,074 A | 4/1986 | Mankina et al. |
| 4,648,043 A | 3/1987 | O'Leary |
| 4,664,528 A | 5/1987 | Rodgers et al. |
| 4,701,055 A | 10/1987 | Anderson |
| 4,719,252 A | 1/1988 | Dutton et al. |
| 4,747,978 A | 5/1988 | Loehr et al. |
| 4,752,740 A | 6/1988 | Steininger |
| 4,913,822 A | 4/1990 | Chen et al. |
| 4,952,376 A | 8/1990 | Peterson |
| 4,965,016 A | 10/1990 | Saitoh et al. |
| 4,977,292 A | 12/1990 | Hwa et al. |
| 4,990,260 A | 2/1991 | Pisani |
| 5,000,866 A | 3/1991 | Woyciesjes |
| 5,004,549 A | 4/1991 | Wood et al. |
| 5,018,871 A | 5/1991 | Brazelton et al. |
| 5,030,334 A | 7/1991 | Hale |
| 5,061,456 A | 10/1991 | Brazelton et al. |
| 5,112,521 A | 5/1992 | Mullins et al. |
| 5,130,033 A | 7/1992 | Thornhill |
| 5,135,968 A | 8/1992 | Brazelton et al. |
| 5,139,627 A | 8/1992 | Eden et al. |
| 5,164,429 A | 11/1992 | Brazelton et al. |
| 5,213,694 A | 5/1993 | Craig |
| 5,230,822 A | 7/1993 | Kamel et al. |
| 5,236,602 A | 8/1993 | Kackson |
| 5,239,257 A | 8/1993 | Muller et al. |
| 5,256,307 A | 10/1993 | Bachhofer et al. |
| 5,262,963 A | 11/1993 | Stana et al. |
| 5,302,356 A | 4/1994 | Shadman et al. |
| 5,306,355 A | 4/1994 | Lagana |
| 5,306,432 A | 4/1994 | Puetz |
| 5,316,031 A | 5/1994 | Brazelton et al. |
| 5,320,748 A | 6/1994 | Dupuis |
| 5,332,511 A | 7/1994 | Gay et al. |
| 5,348,665 A | 9/1994 | Schulte et al. |
| 5,382,367 A | 1/1995 | Zinkan et al. |
| 5,422,014 A | 6/1995 | Allen et al. |
| 5,424,032 A | 6/1995 | Christensen et al. |
| 5,470,480 A | 11/1995 | Gray et al. |
| 5,489,344 A | 2/1996 | Martin et al. |
| 5,494,588 A | 2/1996 | LaZonby |
| 5,518,629 A | 5/1996 | Perez et al. |
| 5,575,920 A | 11/1996 | Freese et al. |
| 5,587,069 A | 12/1996 | Downey, Jr. |
| 5,639,476 A | 6/1997 | Oshlack et al. |
| 5,658,467 A | 8/1997 | LaZonby et al. |
| 5,683,654 A | 11/1997 | Dallmier et al. |
| 5,736,097 A | 4/1998 | Ono |
| 5,770,039 A | 6/1998 | Rigney et al. |
| 5,779,912 A | 7/1998 | Gonzalez-Martin et al. |
| 5,783,092 A | 7/1998 | Brown et al. |
| 5,785,867 A | 7/1998 | LaZonby et al. |
| 5,800,732 A | 9/1998 | Coughlin et al. |
| 5,814,233 A | 9/1998 | Starkey et al. |
| 5,814,247 A | 9/1998 | Derule et al. |
| 5,820,256 A | 10/1998 | Morrison |
| 5,849,985 A | 12/1998 | Tieckelmann et al. |
| 5,855,791 A | 1/1999 | Hays et al. |
| 5,858,246 A | 1/1999 | Rafter et al. |
| 5,858,249 A | 1/1999 | Higby |
| 5,866,013 A | 2/1999 | Kessler et al. |
| 5,882,526 A | 3/1999 | Brown et al. |
| 5,888,374 A | 3/1999 | Pope et al. |
| 5,895,565 A | 4/1999 | Steininger et al. |
| 5,902,751 A | 5/1999 | Godec et al. |
| 5,947,596 A | 9/1999 | Dowd |
| 5,972,196 A | 10/1999 | Murphy et al. |
| 5,980,758 A | 11/1999 | LaZonby et al. |
| 5,985,155 A | 11/1999 | Maitland |
| 6,015,484 A | 1/2000 | Martinchek et al. |
| 6,030,842 A | 2/2000 | Peachey-Stoner |
| 6,045,706 A | 4/2000 | Morrison et al. |
| 6,068,012 A | 5/2000 | Beardwood et al. |
| 6,106,770 A | 8/2000 | Ohki et al. |
| 6,120,619 A | 9/2000 | Goudiakas et al. |
| 6,120,698 A | 9/2000 | Rounds et al. |
| 6,132,593 A | 10/2000 | Tan |
| 6,143,184 A | 11/2000 | Martin et al. |
| 6,146,538 A | 11/2000 | Martin |
| 6,149,819 A | 11/2000 | Martin et al. |
| 6,159,552 A | 12/2000 | Riman et al. |
| 6,238,555 B1 | 5/2001 | Silveri et al. |
| 6,284,144 B1 | 9/2001 | Itzhak |
| 6,315,950 B1 | 11/2001 | Harp et al. |
| 6,409,926 B1 | 6/2002 | Martin |
| 6,419,817 B1 | 7/2002 | Martin |
| 6,423,234 B1 | 7/2002 | Martin |
| 6,503,464 B1 | 1/2003 | Miki et al. |
| 6,991,735 B2* | 1/2006 | Martin ............... 210/748 |
| 2001/0007314 A1 | 7/2001 | Sherman |
| 2002/0023866 A1* | 2/2002 | Barnes ............... 210/192 |
| 2002/0043650 A1 | 4/2002 | Martin |
| 2002/0152036 A1 | 10/2002 | Martin |

FOREIGN PATENT DOCUMENTS

| | | |
|---|---|---|
| DE | 262 139 A3 | 11/1988 |
| DE | 4 312 417 A1 | 10/1994 |
| DE | 19530086 A1 | 8/1995 |
| DE | 19949434 A1 | 10/1999 |
| DE | 19844179 | 3/2000 |
| EP | 0 257 740 A1 | 3/1988 |
| EP | 0 504 621 A1 | 9/1992 |
| EP | 1057784 A1 | 12/2000 |
| FR | 2672058 A1 | 7/1992 |
| GB | 2 027 004 A | 2/1980 |
| GB | 2281742 A | 3/1995 |
| GB | 2306463 A | 5/1997 |
| JP | 60202792 A | 10/1985 |
| JP | 11-033542 | 2/1999 |
| JP | 11028479 | 2/1999 |

| | | |
|---|---|---|
| JP | 11-057752 | 3/1999 |
| JP | 11-057752 A * | 3/1999 |
| JP | 11-290878 | 10/1999 |
| LU | 80951 | 2/1979 |
| WO | WO 89/08728 A1 | 9/1989 |
| WO | WO 96/30307 A1 | 10/1996 |
| WO | WO 00/34760 A1 | 6/2000 |
| WO | WO 01/98558 A2 | 12/2001 |

OTHER PUBLICATIONS

U.S. Filter/Stranco, "Strantrol® mg/1 5 Controller," Data Sheet (2004).
U.S. Filter/Wallace & Tiernan, "Multi Function Analysers Depolox® 4," Technical Information, (date unknown).
U.S. Appl. No. 10/083,284, filed Feb. 26, 2002, Roy Martin.
U.S. Appl. No. 10/083,315, filed Feb. 26, 2002, Roy Martin.
U.S. Appl. No. 10/669,102, filed Sep. 23, 2003, Roy Martin.
U.S. Appl. No. 11/018,421, filed Dec. 21, 2004, Richard Dennis II, et al.
U.S. Appl. No. 11/050,522, filed Feb. 3, 2005, Stephan Andrée.
Kim, Yong H., "On the Activation of Polymeric Flocculants," AIChE Annual Spring Meeting, Houston, TX, Apr. 2-6, 1989.
Dexter et al., "Use and Limitations of Electrochemical Techniques for Investigating Microbiological Corrosion", Corrosion, 1991, vol. 47, No. 4, pp. 308-318.
Gusmano et al., "Electrochemical Noise Resistance as a Tool for Corrosion Rate Prediction", Corrosion, 1997, vol. 53, No. 11, pp. 860-868.
U.S. Filter/Stranco, "Ryznar Stability Index The 3$^{rd}$ Dimension Needed for Proper 'Water Balance,'" Aquatic Technology Newsletter, vol. 1, No. 1, pp. 1-3, no date.
U.S. Filter/Stranco, "Total Dissolved Solids, Friend or Foe?", Aquatic Technology Newsletter, vol. 1, No. 2, 1988; pp. 1-7.
U.S. Filter/Stranco, "The Relationship of ORP to PPM and Its Automated Control," Aquatic Technology Newsletter, vol. 1, No. 3, 1999, pp. 1-5.
U.S. Filter/Stranco, "The Chemistry and Control of Chloramines," Aquatic Technology Newsletter, vol. 1, No. 4, 1999, pp. 1-5.
U.S. Filter/Stranco, "Yes, Your Pool Needs a Calcium Too," Aquatic Technology Newsletter, vol. 1, No. 5, pp. 1-3, no date.
U.S. Filter/Stranco, "Why Do I Have Algae In My Pool?" Aquatic Technology Newsletter, vol. 1, No. 6, 1999, pp. 1-2.
Carpenter, Colleen et al., "Chlorine Disinfection of Recreational Water for *Cryptosporidium parvum*," Emerging Infectious Diseases, vol. 5, No. 4, Jul.-Aug. 1999, pp. 579-584.
U.S. Filter/Stranco, "ECS-Pool (w/CHF-150) Engineering Packet," Apr. 22, 1999.
Kowalsky, L., "Pool-Spa Operators Handbook," National Swimming Pool Foundation, 1983-1990.
Lynntech, Inc., "Electrochemical Ozone Generator," Model 124 Product Literature (date unknown).
U.S. Filter/Stranco, "Strantrol Automated Water Chemistry Control for Commercial Pools," 1998.
U.S. Filter/Stranco, "Strantrol System 3 Pool & Spa Chemistry Controller," 2000.
U.S. Filter/Stranco, "Strantrol System 4 Pool & Spa Chemistry Controller," 2000.
U.S. Filter/Stranco, "Strantrol System5F Pool & Spa Chemistry Controller," 2000.
U.S. Filter/Stranco, "Strantrol System6 Pool Chemistry & Filter Backwash Controller," 2000.
U.S. Filter/Stranco, "Strantrol System7 Mechanical Room Controller for Aquatic Facilities," 2000.
Kloberdanz, B., "The Air in There: Enhancing an Indoor Pool Environment," Recreation Management, 2000.
Selvick, E., "Take Control of 'Yo-Yo' Treatment Cycles," International Aquatics, National Trade Publications, Inc., Jul./Aug. 1997.
Frazier, B., "Automation to the Rescue," Aquatics International, May/Jun. 1998.
Batt, T. et al., "The Water Down Under," Parks & Recreation, Nov. 1999.
Krone, D., "Automated Water Chemistry Control at University of Virginia Pools," Facilities Manager, vol. 13, No. 6, Nov./Dec. 1997.
U.S. Filter/Stranco, "Remote Monitoring for Unstaffed Pools," Parks & Recreation, Nov. 1997.
Minton, E., "On the Waterpark," Swimming Pool/Spa Age (date unknown).
U.S. Filter/Stranco, "Environmental Control at Indoor Pool: New ECS System Eliminates Chronic Air Quality Woes For New York School District Pool," Stranco Products Capsule Case History #806, Jul. 1998.
U.S. Filter/Stranco, "Environmental Control at Indoor Pool Complex: New ECS System Optimizes Air & Water Quality at Colorado Recreation Center," Stranco Products Capsule Case History #807, Nov. 1998.
U.S. Filter/Stranco, "Environmental Control at Indoor Pool: Parks District Uses New ECS System to Eliminate Chronic Air Quality Problems at High School Pool," Stranco Products Capsule Case History #808, May 1999.
U.S. Filter/Stranco, "Environmental Control at Indoor Pool: ECS System Optimizes Air & Water Quality at Texas School District Swim Center," Stranco Products Capsule Case History #811, Nov. 1999.
U.S. Filter/Stranco, "Environmental Control at Special Indoor Pool: New ECS System Eliminates Chronic Air Quality Woes in School District Pool & Spa Serving Special Needs Children," Stranco Products Capsule Case History #812, Oct. 1999.
U.S. Filter/Stranco, "Environmental Control at Indoor Pool: ECS System Eliminates Chronic Air Quality Problems at High School and Parks District Indoor Pool Facility," Stranco Products Capsule Case History #813, Jul. 2000.
U.S. Filter/Stranco, "Environmental Control at Indoor Pool: ECS System Optimizes Air & Water Quality at Iowa Recreation Center," Stranco Products Capsule Case History #814, May 2000.
U.S. Filter/Stranco, "Air & Water Quality Control for Indoor Aquatic Facilities," U.S. Filter Corporation, 1998.
U.S. Filter/Stranco, "Strantrol ECS—Environmental Control System (For Pool)," 2000.
U.S. Filter/Stranco, "Abstracts of Strancol ECS Case Histories," (date unknown).
Williams, K., "Aquatic Facility Operator Manual," National Recreation and Park Association, Second Edition, 1995.
Normenausschusse Wasserwesen, "Treatment and disifection of water used in bathing facilities," DIN 19643-4, Feb. 1999.
Normenausschusse Wasserwesen, "Treatment and disifection of water used in bathing facilities," DIN 19643-3, Apr. 1997.
Normenausschusse Wasserwesen, "Treatment and disifection of water used in bathing facilities," DIN 19643-2, Apr. 1997.
Normenausschusse Wasserwesen, "Treatment and disifection of water used in bathing facilities," DIN 19643-1, Apr. 1997.
Stranco, "The Best of Poolfax," The Poolfax Newsletter, 1981-1984.
Victorin et al., "Redox potential measurements for determining the disinfecting power of chlorinated water," *J. Hyg., Camb.*, 70, 1972, pp. 313-323.
U.S. Filter/Stranco, "Environmental Control System Training Meeting, Mar. 15, 2000".
Kim, Yong H., "Evaluation of Redox Potential and Chlorine Residual as a Measure of Water Disinfection," presented at the 54th International Water Conference, Pittsburgh, PA, Oct. 11-13, 1993.
Scully et al., Disinfection Interference in Wastewaters by Natural Organic Nitrogen Compounds, *Environ. Sci. Techn.*, vol. 30, No. 5, 1996, pp. 1465-1471.
White, Geor. Clifford, Handbook of Chlorination and Alternative Disinfectants, Third Edition, (date unknown), pp. 801, 803-809, 922-924.
Carlson, S., "Fundamentals of water disinfection," *J Water SRT—Aqua*, vol. 40, No. 6, (1991), pp. 346-356.
Lund, E., "Oxidative Inactivation of Poliovirus," from the Virological Laboratory of the Department of Bacteriology, University of Gothenburg, and the Virological Department of the Municipal Laboratories, Gothenburg, Sweden, Springer-Verlag, (1963), pp. 1-49.

Lund et al., "The Effect of Oxidation and Reduction on the Infectivity of Poliomyelitis Virus," from the Virological Laboratory of the Department of Bacteriology, University of Gothenburg, and the Virological Department of the Municipal Laboratories, Gothenburg, Sweden, Springer-Verlag, (1961), pp. 100-110.

Lund, E., "Inactivation of Poliomyelitis Virus by Chlorination at Different Oxidation Potentials," from the Virological Laboratory of the Department of Bacteriology, University of Gothenburg, and the Virological Department of the Municipal Laboratories, Gothenburg, Sweden, Springer-Verlag, (1961), pp. 330-342.

Lund, E., "The Significance of Oxidation in Chemical Inactivation of Poliovirus," from the Virological Laboratory of the Department of Bacteriology, University of Gothenburg, and the Virological Department of the Municipal Laboratories, Gothenburg, Sweden, Springer-Verlag, (1963), pp. 1-13.

Lund, E., "The Rate of Oxidative Inactivation of Poliovirus and its Dependence on the Concentration of the Reactants," from the Virological Laboratory of the Department of Bacteriology, University of Gothenburg, and the Virological Department of the Municipal Laboratories, Gothenburg, Sweden, Springer-Verlag, (1963), pp. 1-18.

Stranco, "Solutions: Effluent Dechlorination", Stranco Product Literature (date unknown).

Hensley, R. et al., "Disinfection Metamorphosis: From Chemical to Control," *Operations Forum*, vol. 12, No. 4, Apr. 1995.

Hetzler, J.T. et al., "ORP: A Key to Nutrient Removal," *Operations Forum*, vol. 12, No. 2, Feb. 1995.

Bossard, G. et al., "Optimizing Chlorination/Dechlorination at a Wastewater Treatment Plant," reprinted from *Public Works*, Jan. 1995.

Eddington, Gordon, "Successfully Managing Wastewater Chlorination," Stranco Product Literature (date unknown).

Ryan, D. et al., "Waste Not, Want Not: Avoiding Chemical Excesses," reprinted from *Operations Forum*, vol. 11, No. 4, Apr. 1994.

D'Adam, D. et al., "A Case Study of Wastewater Plant Disinfection," reprint from *Public Works Magazine*, Nov. 1994.

"Louisiana Plant Uses New Technology for Dechlorination," reprinted from *American City & County*, Feb. 1994.

Kiser, P. et al., "ORP or Residual: Which Measures Oxidation?" Sep. 10, 1992, pp. 1-7.

"Aquasol Controllers: Chemical Automation for Pools and Spas," Product Literature (date unknown).

"Pool and Spa Controller: Acu-200 Pool Management Software," Product Literature (date unknown).

"Acu-Trol Programmable Controllers," Product Literature from www.acu-trol.com, printed Nov. 19, 1999.

Santa Barbara Control Systems, "Chemtrol™ PC Programmable Controllers: Integrated Water Treatment with Remote Control," Product Literature, (date unknown).

"Chemtrol Automatic Pool Controllers," Product Literature from www.sbcontrol.com, printed Nov. 19, 1999.

"Chemtrol—PC6000 Controller," Product Literature from www.sbcontrol.com, printed Nov. 19, 1999.

"Chemtrol—PC3000 Controller," Product Literature from www.sbcontrol.com, printed Nov. 19, 1999.

"AK100 Swimming Pool Control Systems," Product Literature from www.acu-trol.com, printed Nov. 19, 1999.

ACU-TROL, "AK100 Series" Product Literature (date unknown).

ACU-TROL, "Acu-Trol Programmable Controllers: AK100 Series and AK200," Product Literature (date unknown).

Aquasol Controllers, Inc., "Aquasol WTC," Product Literature, (date unknown).

Aquasol Controllers, Inc., "What is a Controller?" Product Literature from www.aquasol.com, printed Nov. 19, 1999.

Aquasol Controllers, Inc., "Aquasol WTC Specifications," Product Literature from www.aquasol.com, printed Nov. 19, 1999.

Aquasol Controllers, Inc., "Aquasol SPC Specifications," Product Literature from www.aquasol.com, printed Nov. 19, 1999.

ACU-TROL, "AK100 Summary," Product Literature from www.acu-trol.com, printed Nov. 19, 1999.

Cat Controllers, "CAT 2000+ Programmable Water Chemistry Controller," Product Literature (date unknown).

Rola-Chem Corporation, "The New Wave in Water Management: Take Control with Rola-Chem," Product Catalog, Apr. 1999.

Strand, R. et al., "ORP As a Measure of Evaluating and Controlling Disinfection in Potable Water," (Source and date unknown).

Mansfeld et al., "Electrochemical Noise Analysis of Iron Exposed to NaCl Solutions of Different Corrosivity," *J. Electrochem. Soc.*, vol. 141, No. 5, May 1994, pp. 1402-1404.

Brusamarello et al., "Analysis of Different Methods to Calculate Electrochemical Noise Resistance Using a Three-Electrode Cell," *Corrosion*, vol. 56, No. 3, Mar. 2000, pp. 273-282.

Mansfeld et al., "Electrochemical Noise Analysis of Iron Exposed to NaCl Solutions of Different Corrosivity," *J. Electrochem. Soc.*, vol. 140, No. 8, Aug. 1993, pp. 2205-2209.

* cited by examiner

ENHANCED AIR AND WATER PURIFICATION USING CONTINUOUS BREAKPOINT HALOGENATION WITH FREE OXYGEN RADICALS

RELATED APPLICATIONS

This application is a divisional application which claims the benefit under 35 U.S.C. § 120 of U.S. Application Ser. No. 10/083,315, entitled "ENHANCED AIR AND WATER PURIFICATION USING CONTINUOUS BREAKPOINT HALOGENATION WITH FREE OXYGEN RADICALS," filed on Feb. 26, 2002, which is now issued as U.S. Pat. No. 7,108,781 on Sep. 19, 2006, which is incorporated herein by reference in its entirety.

BACKGROUND OF THE INVENTION

1. Field of the Invention

This invention relates to the maintenance of water facilities and particularly, to the optimization of oxidizing compounds to sanitize such water facilities.

2. Description of the Related Art

Water or aquatic systems such as swimming pools, spas, hot tubs, including towers, have a variety of associated maintenance and quality related issues. For example, such aquatic systems require diligent maintenance to prevent bacterial and viral contamination. The use of chemical compounds as sanitizers has been used to maintain the sanitization of such systems. The addition of halogen donor compounds can sanitize such aquatic systems under certain conditions. However, the use of chemical sanitizers may be inadequate to address various operating and loading conditions associated with such aquatic systems. For example, the organic loading in a swimming pool may vary depending on the number of users.

Efforts to address such issues have been disclosed. For example, Steininger, in U.S. Pat. No. 4,752,740, suggests the use of monitoring the oxidation-reduction potential (ORP) as a method of measuring the sanitization levels in water. Martin, in U.S. Pat. No. 6,143,184, describes controlling a halogen-based oxidizer using a qualitative measure of ORP control to achieve conversion of organic material to nitrogen. Also, Martin, in U.S. Pat. No. 6,149,819, describes a process for optimizing the rate of oxidation using a combination of halogen and peroxygen.

Aquatic systems having high loadings may tend to form volatile halogenated by-products, even with the use of continuous breakpoint halogenation. The use of peroxygen compounds can reduce the concentration of free halogen needed to sustain a desired ORP in such systems. Nevertheless, some organic compounds are not readily oxidized by such peroxygen compounds.

SUMMARY OF THE INVENTION

According to one embodiment, the present invention provides a water system. The water system comprises a free radical species source fluidly connectable to the water system, an input apparatus disposed in the water system for providing an input signal corresponding to a water quality of the water system and a control system for receiving and analyzing the input signal and regulating the free radical species source to maintain any of a predetermined ORP, COD, TOC and chloramine level in the water system.

According to another embodiment, the present invention is directed to a control system for maintaining a water quality of a water system is provided. The system comprises an input apparatus connected to the water system for transmitting an input signal corresponding to the water quality of the water system, a microprocessor for receiving and analyzing the input signal according to a logic program code and generating a halogen output signal and a hydroxyl output signal, a halogen species source configured to receive the halogen output signal and provide halogen species to the water system, and a hydroxyl species source configured to receive the hydroxyl output signal and provide hydroxyl free radical species to the water system.

According to another embodiment, the present invention provides a method of maintaining water quality in a water system. The method comprises the steps of irradiating a liquid substantially free of hydroxyl free radical scavengers with ultraviolet radiation to generate hydroxyl free radical species, monitoring the water quality of the water system, adding a halogen species to the water system, adding the hydroxyl free radical species to the water system, and controlling the addition of the hydroxyl free radical species to maintain a predetermined water quality.

According to another embodiment, the present invention provides a method of operating a water system. The method comprises the steps of measuring a water quality of water in the water system, comparing the water quality to a desired water quality level and adding a hydroxyl free radical species to the water in an amount sufficient to bring the water quality to within the desired water quality level.

According to another embodiment, the present invention is directed to a water system comprising means for providing free radical species to water in the water system; and means for regulating an amount of free radical species provided to the water to maintain a desirable water quality of water in the water system.

Other advantages and novel features of the invention will become apparent from the following detailed description of the invention when considered in conjunction with the accompanying drawings, which are schematic and not intended to be drawn to scale. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
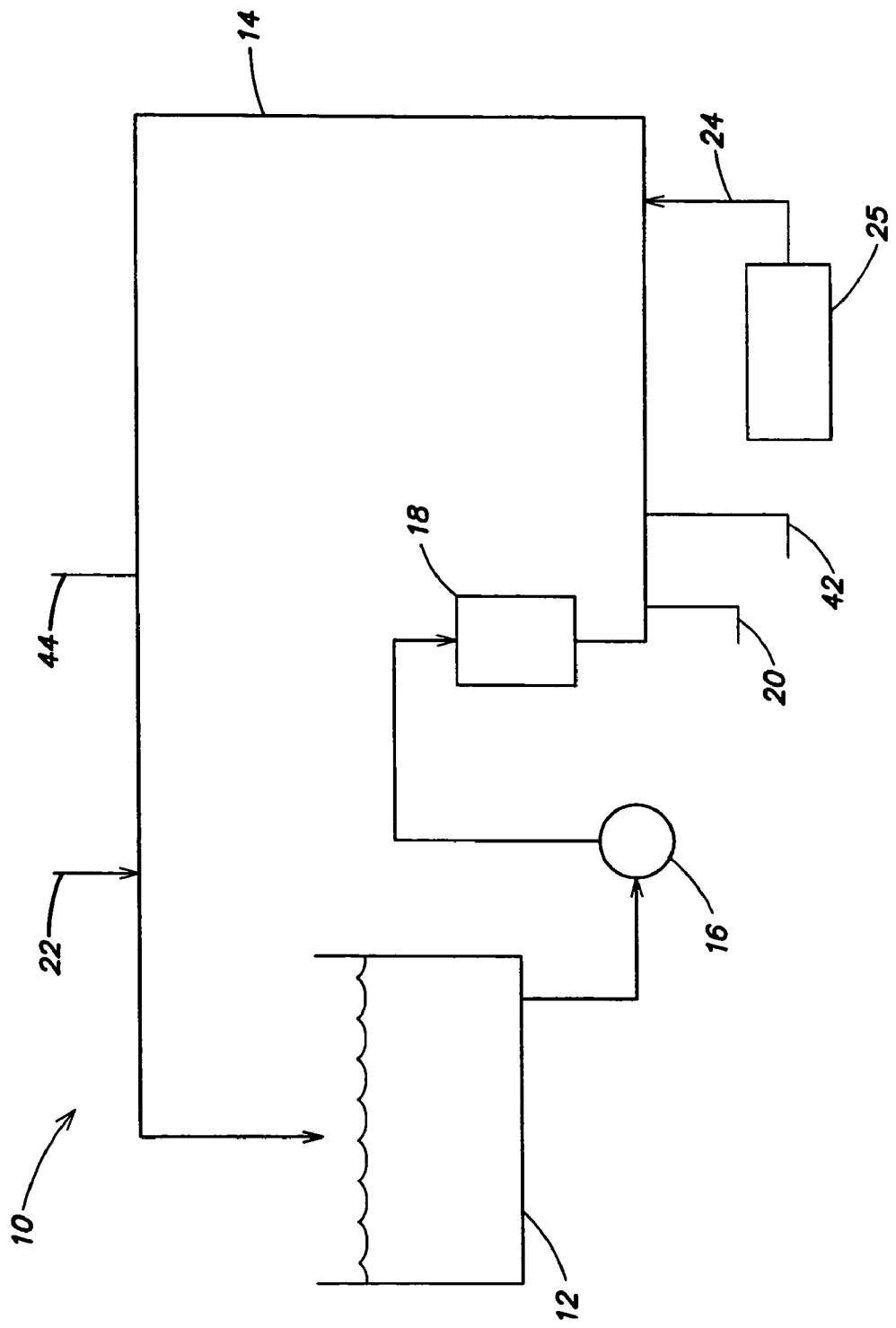
FIG. 1 is a schematic diagram illustrating a water system according to one embodiment of the present invention.

The use of free radical species to oxidize contaminants in a water or aquatic system can enhance the performance of water or aquatic sanitizing systems. Accordingly, one feature of the present invention provides organic nitrogen decontamination using free radical species to increase the rate of sanitization. The present invention provides a method that can sanitize a water or aquatic system using free radical hydroxyl and, in some cases, halogen donor species or even multiple oxidizer species to oxidize nitrogen-based inorganic and organic materials in the water system. According to one embodiment, the present invention provides continuous breakpoint halogenation with a use of hydroxyl free radical species. Thus, a sustained high rate of oxidation in the bulk water of the pool, spas, and other aquatic water systems can be maintained despite the presence of accumulated demand for continuous breakpoint halogenation. In one embodiment, the invention can eliminate undesirable compounds by maintaining a level of oxidation potential. The feedrate and ratio of halogen donor and free radical species can be optimized to sustain the desired ppm range of halogen and sustain an ORP of, for example, 780 mV-820 mV. Sustaining these parameters can prevent or even reverse the accumulation of combined halogen and other halogenated volatile compounds, which can contaminate the air and water of water facilities such as indoor swimming pools.

According to one embodiment, the present invention provides measuring water quality of the water system and, in some cases, to achieving or maintaining a predetermined water quality. The measured water quality can be used to regulate the control parameters of the water system. According to some embodiments, ORP can be used to define the performance or potential of a species that can affect the water quality of the water system. For example, a species such as a halogen species or an oxidizing species to react with a contaminant. ORP can measure the potential generated by the active species and discriminate from inactive forms such as combined chlorine derivatives. In accordance with standards set forth by the World Health Organization, ORP levels of about 650 mV can be interpreted to represent disinfection of a body of water in which viral inactivation is virtually instantaneous. Halogen species can be used to oxidize various organic contaminants as well as inorganic nitrogen-based compounds such as, but not limited to, urea, uric acid, and amino acids. However, the use of chlorine, for example, can result in undesirable chlorinated by-products associated with incomplete oxidation. Such by-products can be volatile and can be irritants as well as promote undesirable corrosion of water system equipment. Moreover, local regulations may limit the concentration of free chlorine, for example, as HOCl and OCl in aquatic systems. In some localities, sufficient HOCl may not be available to maintain sufficient oxidation rates to meet loading demands of the water system. Such conditions can lead to the accumulation of undesirable contaminants and by-products thereof following substoichiometric reactions. For example, continued halogen oxidation of such contaminants can lead to increased concentrations of by-products such as chloramines, especially if enough free halogen cannot be maintained to meet the stoichiometric requirements. Such conditions can have a buffering effect that can lead to an increased halogen donor demand, even to levels that exceed maximum regulated levels. However, when halogen donors are controlled using ORP-based control systems with, for example, an ORP setting of between about 780 mV to about 800 mV, the buffering effect of chloramines can be reduced.

However, the present invention is not limited to ORP control and may, for example use a variety and combination of systems and subsystems to effect, achieve or maintain a desirable or predetermined water quality. Thus, according to some embodiments, the present invention can provide regulating, achieving or maintaining any of a predetermined ORP, COD, TOC and chloramine level, or combinations thereof. In some cases, the desirable water quality can be achieved by regulating, controlling or maintaining an operating parameter or control parameter. For example, the present invention can provide for sustaining a desirable ORP, such as 750 mV +/-1%, by, for example, adding a controlled amount of any of halogen species and free radical species, or both.

Organic nitrogen-based contaminants can impose a heavy demand on halogen-based sanitization systems. Further, halogen-based decontamination systems can form undesirable by-products such as, but not limited to, nitrogen chlorides.

ORP can be a qualitative measurement of the oxidation or reduction power of a solution. While ORP can be used as the primary indicator of determining the inactivation rates of various bacteria and viruses, dosing the water with ppm measurement of halogen has been the method used for meeting the oxidation needs of the water facility. For example, while 650 mV is commonly used as the minimum required oxidation potential to ensure sanitized conditions in a pool or spa, health departments typically still require ppm levels of halogen, e.g. chlorine.

Shocking of water systems wherein halogen donors are added to water systems above stoichiometric levels to completely oxidize contaminants including by-products such as chloramines have been used. However, such techniques are unavailable especially when the water system is in use. Further, in some cases, shocking can fail to remove such contaminants because the concentration of halogen donors required is an estimate based on a spot measurement. Moreover, the buffering effect can be attributed to accumulated demand that is insoluble or partially soluble in the water system. For example, contaminants trapped in the filter media in the walls of the water system and which can be released as the halogen donor is consumed.

Despite maintaining health departments levels of halogen and/or operating with ORP levels in excess of 650 mV, following prescribed methods of superchlorination, or breakpoint chlorination, problems resulting from incomplete oxidation can still persist.

Ozone can be used as a side stream treatment to destroy these undesirable substances. While it may be effective, ozone typically cannot be applied to the bulk water of the water system where the contaminants are being added. Also, ozone typically cannot be used as a stand-alone treatment because it cannot maintain a residual level in the water system. Further, ozone can destroy halogen species by attacking, for example, the hypochlorite ions, thereby further increasing operating and maintenance costs.

Non-chlorine shock treatments incorporating peroxygen compounds, such as, but not limited to, potassium monopersulfate (MPS), such as OXY-BRITE® bleach, available from Great Lakes Biochemicals, can be used to attack chloramines. The method of shock feeding can be a means of addressing the symptoms resulting after the problem makes them apparent, e.g. high chlorine concentration and foul odors. Peroxygen compounds, in some cases, can be used as a shock treatment even while the water system is in use. However, when applied to systems using halogen donors, for example, the system can experience undesirable side effects. For example, the shock addition of MPS can increase the measured ORP. And, as long as the ORP value remains above the set point established for the halogen donor system, no halogen donor is fed. Since many of the contaminants entering the water do not react directly with MPS without first being oxidized by, for example, chlorine donors, these substances further accumulate, thereby compounding the problem.

This invention incorporates a process that allows the water facility to maintain the desired ORP and oxidize the chlorinated volatile substances in the bulk water, while not exceeding the free halogen limits established by local health regulations.

This process can incorporate optimization of the rate of oxidation by controlling the feedrate and ratio of, in some embodiments, two oxidizers, a primary oxidizer being a halogen donor source, e.g. trichloroisocyanuric acid, dichloroisocyanuric acid, sodium bromide, hydantoin based bromines, gaseous chlorine, calcium hypochlorite, sodium hypochlorite, lithium hypochlorite and mixtures thereof; and another oxidizer being, in some embodiments, a free radical species such as, but not limited to hydroxyl free radical. The ratio of free radical species to halogen donor species can be optimized to sustain the desired ppm range of halogen donor, while achieving an ORP of 780 mV-820 mV. By optimizing and controlling the feedrate and ratio within the desired ORP range, the rate of oxidation can be maintained at a level that is sufficient to prevent the accumulation of undesirable by-products. Further, in some cases, the process can be optimized by incorporating the necessary process control and feed equipment to hit a target set-point, thereby controlling the concentration of undesirable by-products in the water system.

In one embodiment, the present invention incorporates optimizing the rate of oxidation by controlling the feedrate and ratio of, for example, two oxidizers, wherein the primary oxidizer is typically a halogen donor and the other can be a free radical species. For example, the ratio of free radical species to halogen donor can be optimized to sustain the desired ppm range of halogen, while achieving an ORP range of, in one embodiment, 780 mV-820 mV. By optimizing and controlling the feedrate and ratios to maintain the desired ORP, the rate of oxidation should be sufficient to prevent the accumulation of undesirable by-products. Optimizing the ratio of halogen donor to free radical species, while controlling their combined feedrate using ORP, can effectively reduce or even eliminate the problems resulting from the accumulation of volatile halogenated substances. This can be achieved while maintaining lower ppm levels of free halogen than is otherwise required in a strictly halogen donor system. In another embodiment, the present invention provides the controlled use of multiple oxidizing agents, in addition to halogen donors and free radical species. For example, controlled addition of a peroxygen compound can be used to maintain an ORP within the predetermined range.

In one embodiment, the present invention typically involves: achieving and sustaining an optimum concentration of free halogen, e.g. free chlorine, of between 0.2 ppm -10 ppm; addition of free radical species to raise the solution's ORP to 750 mV-850 mV, preferably 760 mV-800 mV or even within +/−1% of 750 mV, controlling the feed of both oxidizers using an ORP controller; and optimizing the ratio of halogen donor to free radical species to sustain the optimized halogen donor while achieving the desired ORP.

By operating in the conditions described, the by-products, which can result from intermediate steps in the continuing process of oxidation and can be produced during the initial step of oxidation, should not accumulate. While these by-products can be initially produced, they should not accumulate, and shortly thereafter, are typically destroyed by the continued oxidation. By preventing the accumulation of these volatile by-products, their respective partial pressures can be minimized, and, accordingly, the problems of poor water or air, or both, quality can be minimized or prevented. Also, in water facilities that currently experience these problems, by implementing this application, the problems of poor air quality resulting from these chlorinated compounds can be reversed through re-absorption of the volatile chlorinated compounds, followed by oxidation, even while maintaining substoichiometric levels of free halogen.

The present invention, in another embodiment, provides for the feed of coagulating agents that can be used to neutralize the charge density of water-soluble organic complexes, thereby making them water-insoluble. The water-insoluble precipitates can be separated from the oxidizers utilizing, for example, settling, filtration, flocculation, agglomeration and, in some cases, followed by settling, or flocculation followed by filtration.

In some cases, the present invention can feed coagulating agent, sometimes referred to as a polymer, to the system, which can convert water-soluble organics into water-insoluble organics thereby allowing separation from the oxidizer. Reduced organic demand on oxidizer enhances the oxidation potential of the oxidizer and further enhances efficient continuation of breakpoint halogenation. In some embodiments, the controlled addition of the coagulating agent can reduce, or optimize, the amount of halogen donor or peroxygen compound, or both. The present invention can, in some embodiments, further reduce any volatile by-products associated with incomplete oxidation. The controlled addition of coagulation agents can reduce the amount of halogen donor or peroxygen compound addition and, thus, the likelihood of incomplete oxidation, which should reduce volatile by-products. The coagulating agent can be fed at a sufficient frequency and level of concentration to allow halogen to remain in optimum range while sustaining desired ORP, e.g. Within an effective range of 700 mV-850 mV, or within +/−1% of 750 mV, with chlorine levels in the range of 0.1 ppm-10 ppm. Useful coagulants include, for example, Alum, poly-aluminum chloride, sodium aluminate, polyamines, polyquaternary compounds, polydiallyl-dimethyl ammonium chloride, chitosan (poly-D-glucosamine) and chitin (poly-n-acetyl-D-glucosamine) alone or in any combination. The coagulant dosage rates can be 0.01 ppm-10 ppm. The coagulant may be fed to the system by any known method effective to introduce the coagulant to the water treatment system, such as, but not limited to, low level continuous feed, feed on demand, e.g. ORP activated, and periodic feed under timer based control.

According to one embodiment, the present invention provides a water system as schematically illustrated in FIG. 1. The water system 10 can comprise a body of water 12 in a circulation system 14. Circulation system 14 typically includes pump 16 and optionally an inline filter 18 so that water is withdrawn from body of water 12, it can be filtered as it passes through circulation system 14 before being returned to body of water 12. Optionally connected to circulation system 14 are sensor element 20 and connections or ports 22 and 24. In some cases, water system 10 can comprise body of water 12 fluidly connected to a free radical source or generator 25, for example, port 22 or 24. The present invention can provide a method of improved control of oxygen concentration and delivery based on specific requirements and needs as well as measured program performance.

Figure 2:
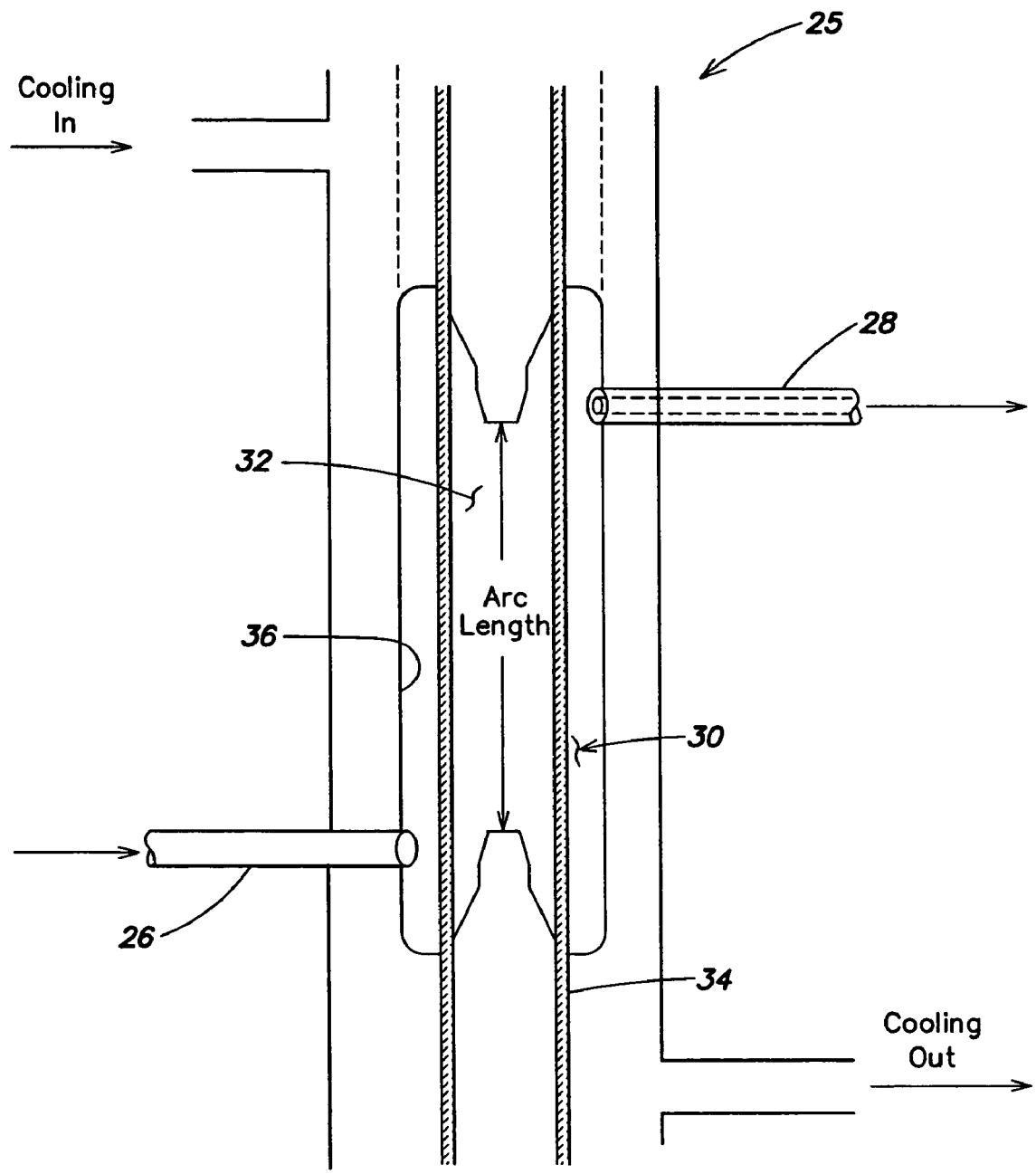
FIG. 2 is a schematic diagram showing the free radical generator according to one embodiment of the present invention.

In another embodiment, the present invention provides a system for employing and delivering an oxidant solution comprising free radical species, such as, but not limited to, hydroxyl free radical species to water system 10. Free radical source or generating apparatus 25, according to one embodiment of the present invention, is schematically illustrated in FIG. 2. Free radical generator 25 can have an inlet 26, typically from a reactant solution source (not shown), and an outlet 28. Connecting the inlet and outlet is channel 30, such as annular chamber. According to one embodiment, within the chamber can reside an actinic radiation source 32 contained within a transparent wall 34. Free radical generator 25 can have channel 30 that can fluidly connect to the inlet and can be disposed to flow substantially pure water therethrough. Free radical generator 25 can also comprise a source of actinic radiation that is disposed to irradiate the substantially pure water flowing along the channel such that upon irradiation, free radicals are generated therein. In some cases, outlet 28 of the free radical generator is fluidly connected to circulation system 14 at port 24. In some embodiments, the actinic radiation source emits electromagnetic radiation in the ultraviolet range, preferably with a wavelength that is less than 300 nanometers, and more preferably with a wavelength that is less than 254 nanometers. The free radical generator apparatus, according to some embodiments of the present invention, has a low power consumption, such as about or less than 100 KW, in some cases, about or less than 10 KW and, in other cases, about or less than 1 KW for a water system that has about or greater than 10,000 gallons of water. Examples of actinic radiation sources are available commercially from, for example, Aquionics Incorporated (Erlanger, Kentucky). The intensity of the actinic radiation source can vary, typically, decreasing, after, a period of use. For example, the rated intensity or dosage of a specific ultraviolet lamp can decrease over time as described by Rodriguez et al. in Disinfection, Liquid Purification by UV Radiation, and Its Many Applications, Ultrapure Water, September 1991, pages 22-30, Typically, an ultraviolet lamp is rated accordingly according at its end of lamp life to insure minimum dosage levels. The present invention is not limited to a particular low or medium pressure lamp; thus, either or both may be used provided the lamp has sufficient intensity to initiate or generate the required free radical species yield.

Further, the free radical generator can include free radical precursors that can be used to increase the produced free radical concentration. The free radical precursors can comprise, for example, hydrogen peroxide, singlet oxygen, ozone, oxygen, peroxide complexes and combinations thereof. To further increase the free radical species yield, the free radical generator can incorporate catalytic material such as titanium dioxide, into for example, the reactant solution of a surface contacting the reactant solution and irradiated by the actinic radiation. Moreover, the reactant solution, which can be irradiated in free radical generator 25, can be substantially pure or at least substantially free of free radical-consuming species or have a very low oxygen demand. For example, reactant solution can be substantially pure water.

Although the present invention has been described with respect to the use of an exemplary free radical generator schematically illustrated in FIG. 2, other free radical generators may be used, including those disclosed by, for example, Weres et al. in U.S. Pat. No. 4,439,577, wherein free radicals are generated utilizing a novel electrode operated at sufficiently positive anodic potential.

The generation of oxidant solution comprising free radical species, using free radical generator 25 and reactant solution, depends on several factors including, for example, the flow rate of reactant solution flowing within chamber 30, the intensity or power as well as the wavelength or wavelength spectrum of actinic radiation source 32 as well as the presence of free radical-consuming species present in the reactant solution, for example, the substantially pure water source (not shown). Other factors that may effect the concentration or the abundance of free radical species generated and available for use in system 10 include the presence of contaminating organic or inorganic species in, for example, the substantially pure water solution which can lead to, in some cases, undesirable competing reactions. In some cases, the reactant solution can be water that has been, for example, purified, such as by filtration, electrodeionization, electrodialysis, reverse osmosis, distillation, ion exchange, or combinations thereof. Further, the contact, residence or irradiation time of the reactant solution during exposure to the actinic radiation as well as the distance of photon travel, the number of photon collisions and the presence or absence of a catalyst within chamber 30 during the exposure to actinic radiation can affect the yield of the free radical species.

In another embodiment, the reactant solution is solution that has a low NTU value as well as having low total dissolved solids. Typically, the reactant solution has an NTU value below 100, or even less than 1. In other cases, the total dissolved solids content is typically below 2,000 ppm or even less than 100 ppm. Accordingly, in some embodiments, the composition of the reactant solution is conducive to provide stability to free radicals by having little or no species that would consume the produced free radical species. Further, survivability of such free radical species may depend on the pH of the reactant solution. Accordingly, the pH of the reactant solution is typically low or below about 10, or below about 9, or even below about 8.

According to another embodiment, the reactant solution further includes free radical donors that, for example, upon irradiation by the actinic radiation, can release, initiate or generate free radical species such as, but not limited to OH●. Examples of such donors include, but are not limited to, hydrogen peroxide, ozone, oxygen, singlet oxygen, other peroxide donors as well as peroxygen compounds. Typically, such donors would have a low level of dissolved solids when introduced into the reactant solution to minimize potentially undesirable competing reactions that can consume free radicals thereby affecting the yield of free radicals. For example, peroxygen compounds as peroxide donors that can increase dissolved solids that can react with the hydroxyl radical species include, but are not limited to, peroxodisulfate ions ($S_2O_8^{-2}$) and hydrogen peroxomonosulfate ($HSO_5^-$). Such species can reduce the overall efficiency of free radical species production because they can consume generated free radicals. However, in some cases, salt-based reactants may be beneficial for other reasons. For example, using peroxide donors available in dry powder form may be more convenient for operational purposes even though their use may reduce the overall free radical yield.

In some embodiments, the present invention includes a control system that can regulate the operating parameters of the water system 10 including, but not limited to controlling and regulating continuous breakpoint halogenation with free radicals. The control system, according to some embodiments, can monitor an operating parameter and, in turn, regulate a control parameter of water system 10. For example, the control system can receive an input signal, or a plurality of signals, from a sensor, or a plurality of sensors, measuring any of, for example, temperature, pH, flow rate, concentration, and ORP, or combinations thereof. The control system can convert the input signal and compare such a signal to a set point, or a desirable operating range, and adjust a unit operation of the water system by sending, for example, an output signal that can actuate a valve, energize a pump motor, adjust an applied voltage or current, or both, to a power supply unit energizing, for example, the actinic radiation source or the anodic oxidation apparatus. Thus, in some embodiments, the valve, or plurality of valves, can control the introduction of any of the halogen donor, the free radical species, the coagulant, and a secondary oxidizing species until the measured operating parameter falls within the desired range or ratio. In other embodiments, the control system can further monitor and adjust, intermittently or continuously, any of the parameters of the water system such as, but not limited to, temperature, pH and even raw material feed such as the free radical source or precursor.

The control system of the present invention can comprise a microprocessor, such as, but not limited to, a PC-based system, a distributed control system, and a PLC, or combinations thereof. The control system, as known in the art can have program logic code supervising any of the monitoring, processing and regulating sub-functions of the control system. Further, the control system can be configured in to be under feedback, feedforward or open loop control with or without any of proportional, derivative or integral hierarchy gains. Further, the control systems can have adaptive algorithms that based on, for example, artificial intelligence or neural network systems, that can adjust and learn based on use and loading demand functions, wear of equipment, such as loss of ultraviolet intensity, or even loss or failure of subsystems.

In other embodiments, the control system can regulate the addition of oxidizing species, including, but not limited to free radical species such as hydroxyl free radicals, halogen species such as chlorine, and peroxygen compounds such as MPS, to regulate, or minimize, TOC, COD, ORP or chloramine, or even combinations thereof, in the water or water system using analog or digital, or combinations thereof, techniques.

EXAMPLE

In this Example, the generation of hydroxyl free radicals and their effectiveness in disinfecting a body of water using continuous breakpoint halogenation was evaluated. Specifically, the water system 10 schematically shown in FIG. 1 using the free radical generator 25 shown in FIG. 2 was used. The free radical generator had a reactor sleeve having the surface 36 made of 3/16 L stainless steel and used a synthetic high-purity fused quart sleeve to encase a 1 kilowatt medium-pressure ultraviolet lamp from Alpha-Cure LTD (Norhants, United Kingdom). Free radical generator 25 was operated with a reactant solution flow rate of about 200 ml/minute and irradiation (UV contact) time of about 11 seconds to produce a reactant solution having about 0.5% strength as active $H_2O_2$. Distilled water or water pretreated by filtration and reverse osmosis was used as the reactant solution. The water system had a body of water that was about 13,000 gallons and had a circulation flow rate through circulation system 14 of about 500 gallons/minute. The body of water had an initial contaminant, glycine, concentration of about 4.6 ppm.

Figure 3:
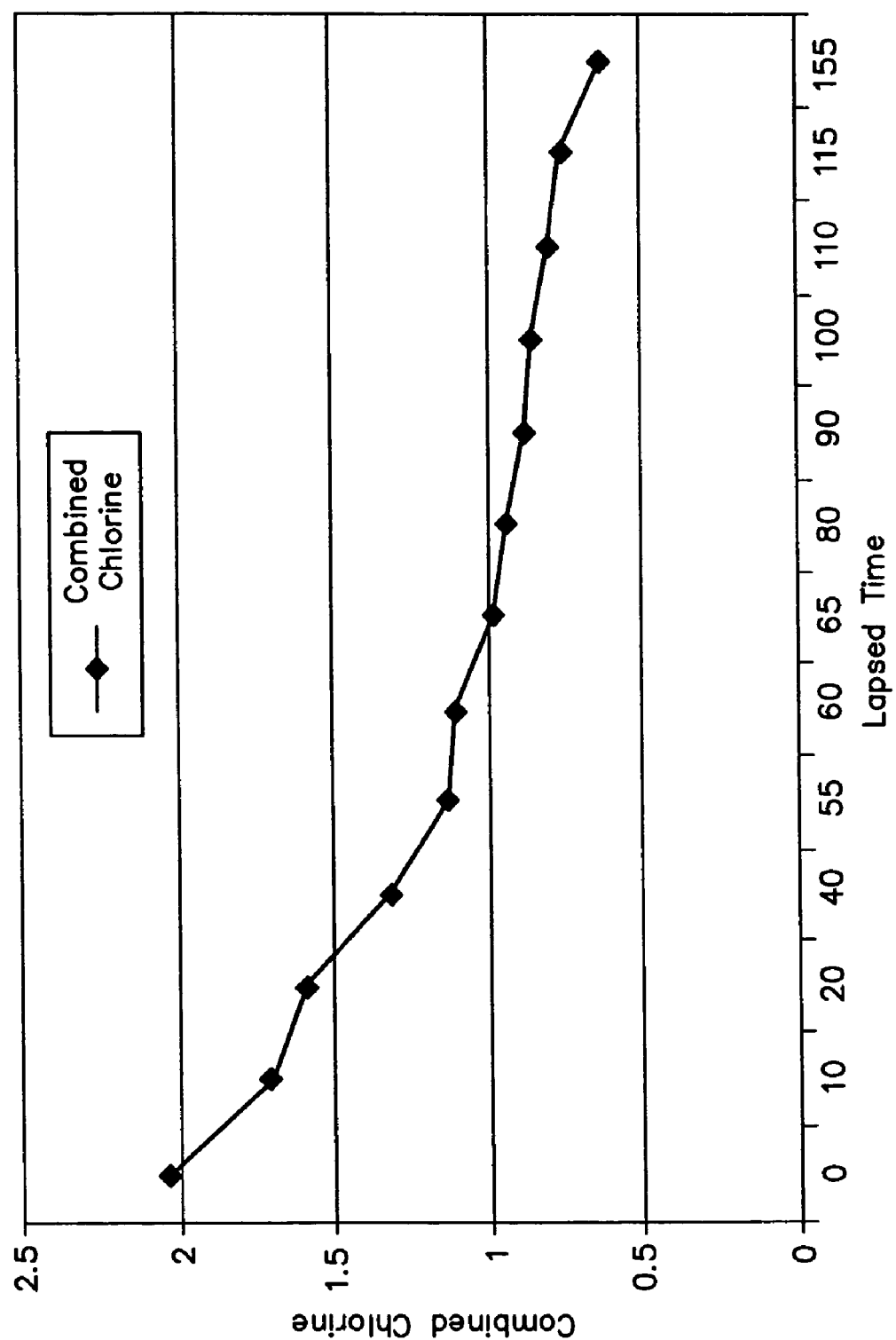
FIG. 3 is a graph showing chloramine destruction with hydroxyl free radical species in the system shown schematically in FIG. 1.
Figure 4:
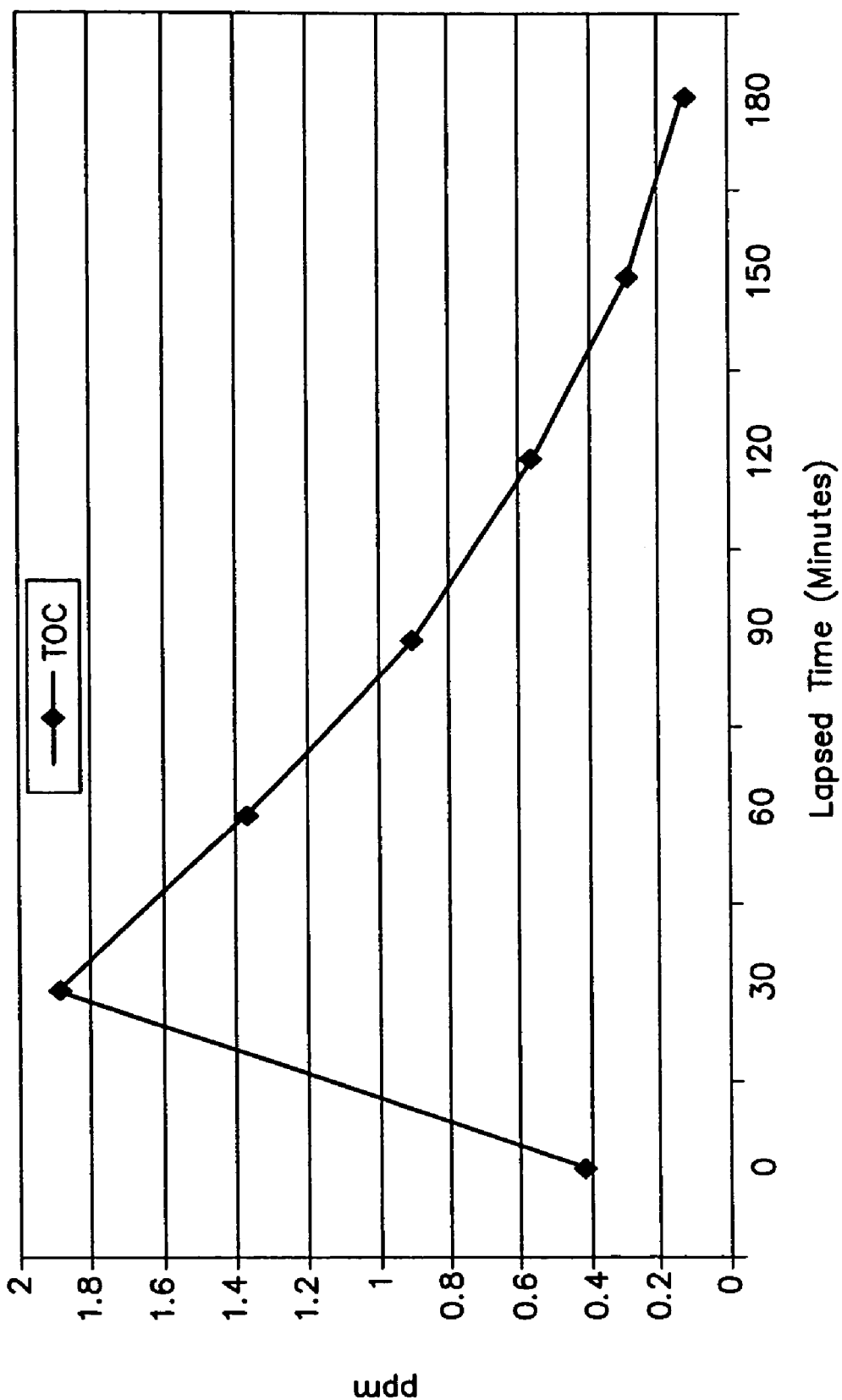
FIG. 4 is a graph showing TOC destruction using hydroxyl free radical species in the system shown schematically in FIG. 1.

During operation, several examples were retrieved from circulation system 14, as well as body of water 12, and evaluated for chloramine, measured as combined chlorine, and TOC to evaluate the effectiveness of the continuous breakpoint system. Samples were retrieved and analyzed at sample point 42 from circulation system 14 approximately 3 to 5 feet before hydroxyl free radical introduction at port 24. Samples were retrieved and analyzed at sample point 44, approximately 3 to 5 feet after hydroxyl free radical introduction. Samples were retrieved and analyzed at a sample point approximately 8 to 10 feet after hydroxyl free radical introduction and, samples were retrieved and analyzed at a sample point approximately 15 to 20 feet after hydroxyl free radical introduction. A nozzle was used in port 24 to introduce the oxidant solution having hydroxyl free radicals to accelerate the mixing of the oxidant solution from free radical generator 25 within the stream flowing in circulation system 14. FIG. 3 shows measured chloramine concentration, as combined chlorine, as function of time after the introduction of the hydroxyl free radical species without halogen species and shows that chloramine, as combined chlorine, was consumed by the hydroxyl free radical species and reduced to below 1 ppm after about 65 minutes of operation. FIG. 4 shows a graph of TOC concentration as a function of time after the introduction of the hydroxyl free radical species and shows that TOC was reduced by the use of hydroxyl free radical species to below 1 ppm after about 90 minutes of operation. Thus, hydroxyl free radical species can be used in a water system to reduce chloramines as well as TOC.

Figure 5:
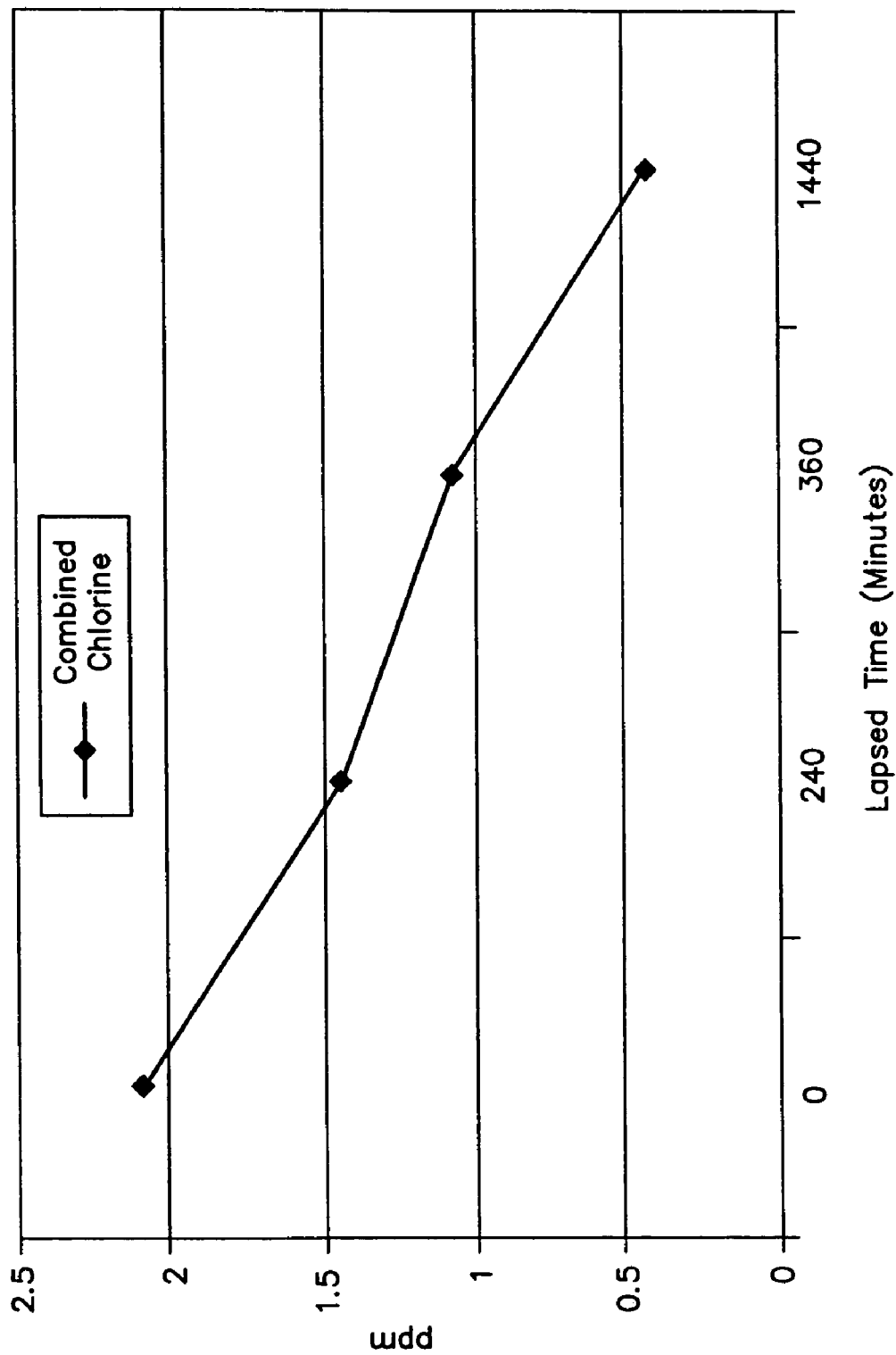
FIG. 5 is a graph showing chloramine destruction with halogen and hydroxyl free radical species in the system of FIG. 1.

In another run, chloramine destruction was evaluated using halogen oxidation without the use of hydroxyl free radical species under ORP set point control. Specifically, the set point was set at 780 mV in the same system operating at substantially the same conditions. FIG. 5 shows the measured chloramine concentration, as combined chlorine, and reduction as a function of time after chlorine feed at port 22. Notably, FIG. 5 shows that chloramine concentration was reduced to 1 ppm after about 360 minutes and considerably longer than with hydroxyl free radical scavenging alone, as illustrated in FIG. 3.

Figure 6:
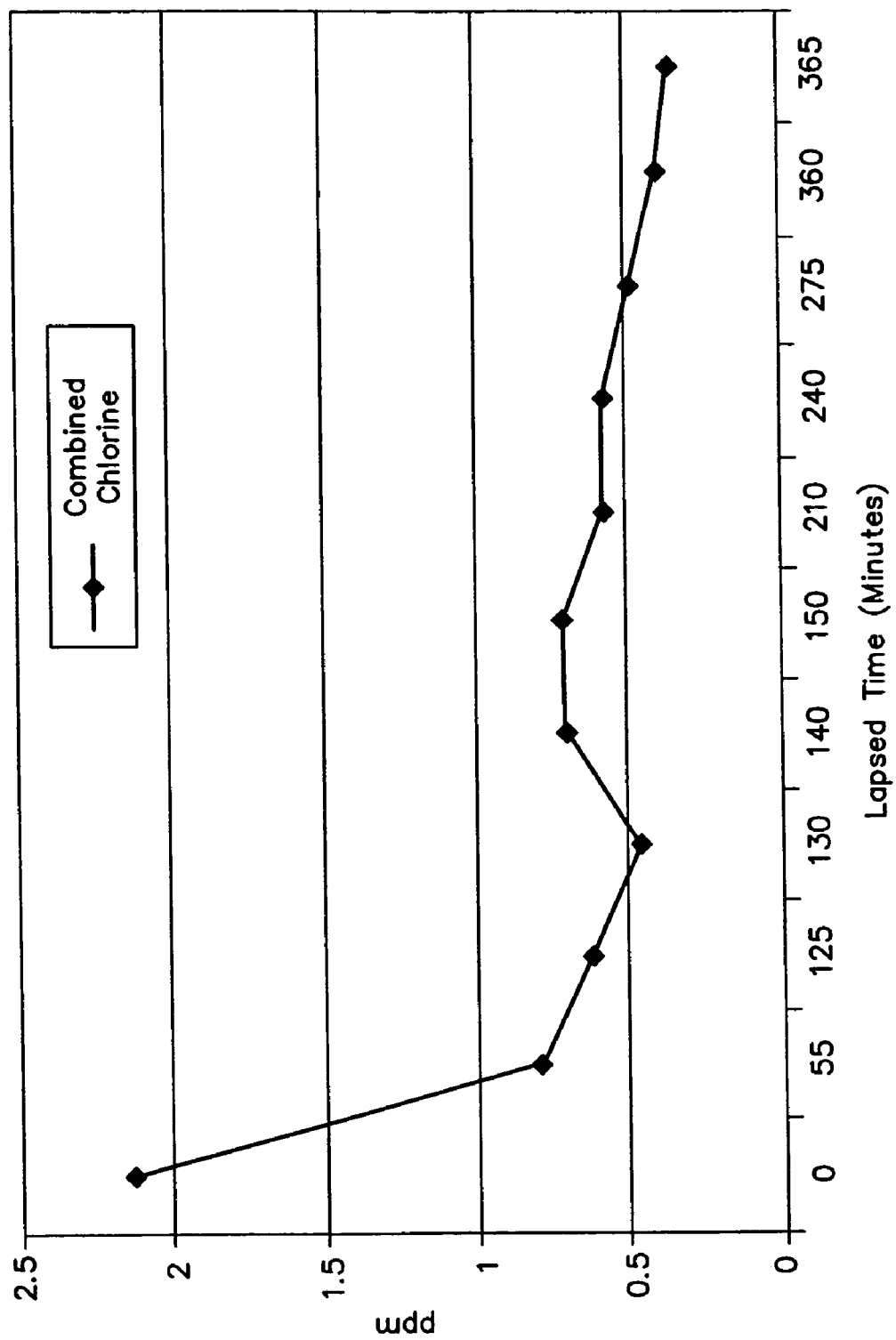
FIG. 6 is a graph showing chloramine destruction using halogen and hydroxyl free radical species in the system shown in FIG. 1.

In another run, chloramine destruction was evaluated under ORP control using a combination of chlorine with OH● species. Specifically, a chlorine and hydroxyl free radicals were introduced into water system 10 until the measured ORP reached the set point of about 780 mV. FIG. 6 shows the chloramine concentration, as combined chlorine, as a function of elapsed time and demonstrates that chloramine was reduced to below 1 ppm after about 55 minutes of operation, significantly faster than with using free radicals species exclusively. Notably, FIG. 6 further shows that contaminant concentration can be stably reduced down to approximately 0.5 ppm. Thus, the following Example shows that hydroxyl free radicals can be used with halogen donors under ORP control to sanitize a water system.

Those skilled in the art should appreciate that all parameters and configurations described herein are meant to be exemplary and that actual parameters and configurations will depend upon the specific application in which the systems and methods of the present invention are used. Those skilled in the art should recognize, or be able to ascertain, using no more than routine experimentation, many equivalents to the specific embodiments of the invention described herein. For example, those skilled in the art should recognize that multiple free radical generators can be used to treat a water system or that a plurality of free radical generators can be used, each having different or adjustable power ratings to compensate for, for example, wear or reduced yield with aging. It is, therefore, to be understood that the foregoing embodiments are presented by way of example only and that, within the scope of the appended claims and equivalents thereto, the invention may be practiced otherwise than as specifically described. For example, the reactant solution can be treated to have a low oxygen demand to remove free radical-consuming species. Further, although ORP can be used as a measure, in some cases, of water quality, other measures of water quality, direct or indirect, can be used in the present invention. For example, pH, temperature, composition, concentration, turbidity, oxygen demand as well as combinations thereof can be used. The present invention is directed to each feature, system, or method described herein. In addition, any combination of two or more features, systems or methods, if such features, systems or methods are not mutually inconsistent, is considered to be within the scope of the present invention.

What is claimed is:

1. A control system for maintaining a water quality of a water system comprising:
    an input apparatus connected to the water system and configured to transmit an input signal corresponding to the water quality of the water system;
    a microprocessor configured to receive and analyze the input signal according to a logic program code and generate a halogen output signal and a hydroxyl output signal;
    a halogen species source configured to receive the halogen output signal and provide halogen species to the water system; and
    a hydroxyl species source configured to receive the hydroxyl output signal and provide hydroxyl free radical species to the water system.

2. The control system of claim 1, wherein the hydroxyl species source comprises an ultraviolet radiation source.

3. The control system of claim 2, wherein the ultraviolet radiation source is fluidly connected to a substantially pure water source.

4. A method of maintaining water quality in a water system comprising:
    irradiating a liquid substantially free of hydroxyl free radical scavengers with ultraviolet radiation from an ultraviolet radiation source to generate hydroxyl free radical species;
    monitoring the water quality of the water system;
    adding a halogen species to the water system;
    adding the hydroxyl free radical species to the water system; and
    controlling the addition of the hydroxyl free radical species to maintain a predetermined water quality.

5. The method of claim 4, wherein the liquid is substantially pure water.

6. The method of claim 4, further comprising the step of controlling the addition of the halogen species.

7. The method of claim 4, further comprising the step of maintaining a halogen species concentration in the aquatic system of about 0.2 ppm to about 10 ppm.

8. The method of claim 4, wherein the halogen species is at least one of trichloroisocyanuric acid, dichloroisocyanuric acid, sodium bromide, hydantoin-based bromine, gaseous chlorine, calcium hypochlorite, sodium hypochlorite, and lithium hypochlorite.

9. The method of claim 4, wherein the predetermined water quality corresponds to an ORP range of about 700 mV to about 850 mV.

10. The method of claim 4, wherein the predetermined water quality corresponds to a chloramine concentration of less than about 1 ppm.

11. The method of claim 4, wherein the predetermined water quality corresponds to a TOC of less than about 1 ppm.

12. The method of claim 4, further comprising the step of adding a hydroxyl free radical precursor.

13. The method of claim 12, wherein the hydroxyl free radical precursor is hydrogen peroxide.

14. A method of operating a water system comprising:
    measuring a water quality of water in the water system;
    comparing the water quality to a desired water quality level;
    adding a hydroxyl free radical species to the water in an amount sufficient to bring the water quality to within the desired water quality level;
    adding a halogen species to the water system.

15. The method of claim 14, wherein adding the hydroxyl free radical species maintains an ORP of the body of water at about 700 mV to about 900 mV.

16. The method of claim 15, wherein the ORP is maintained at about 780 mV +/−1%.

17. The method of claim 14, wherein the halogen species is added to maintain a halogen species concentration of about 0.2 ppm to about 10 ppm.

18. The method of claim 17, wherein the halogen species is added to maintain the halogen species concentration of about 1.5 ppm to about 2 ppm.

19. The method of claim 14, wherein the halogen species is at least one of trichloroisocyanuric acid, dichloroisocyanuric acid, sodium bromide, hydantoin-based bromine, gaseous chlorine, calcium hypochlorite, sodium hypochlorite, and lithium hypochlorite.

* * * * *